B. L. CHAMBERS.
ATTACHMENT FOR FLUSHING TANKS.
APPLICATION FILED SEPT. 23, 1914.
1,149,896.
Patented Aug. 10, 1915.
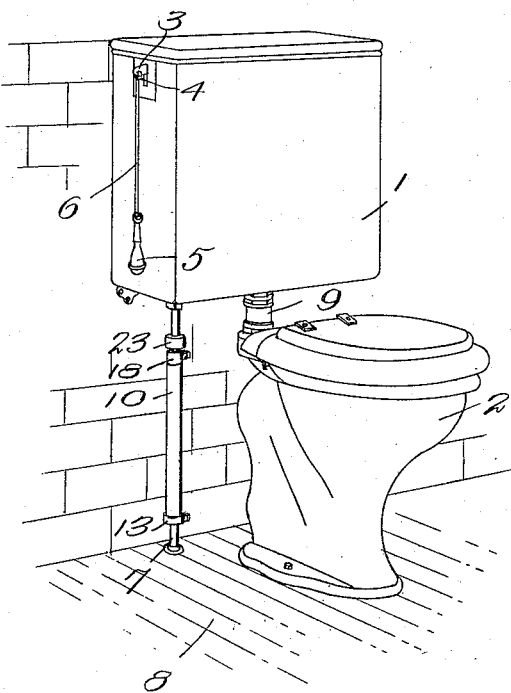
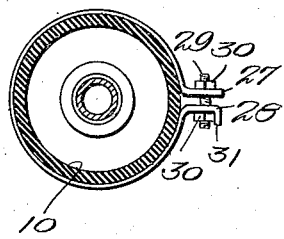
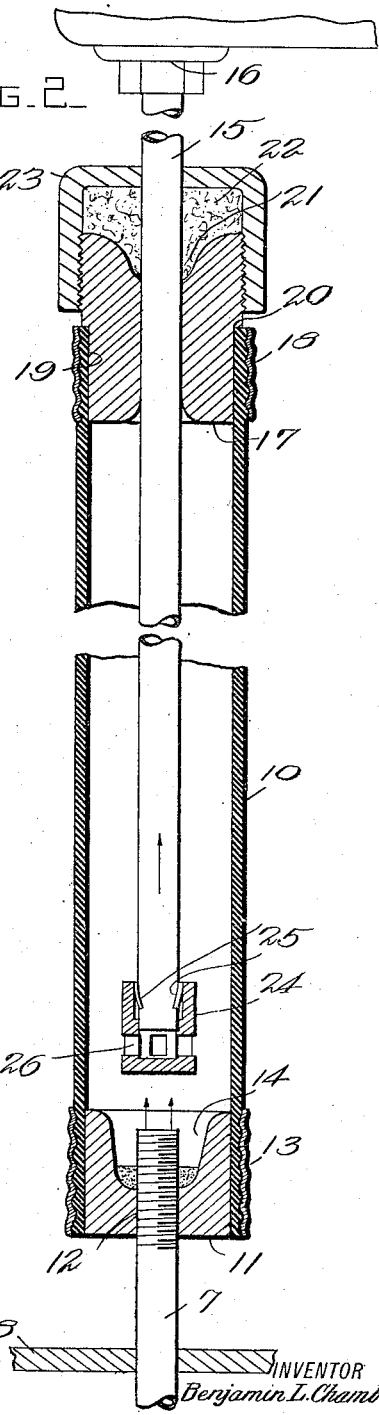
WITNESSES
INVENTOR
Benjamin L. Chambers
BY
ATTORNEYS

UNITED STATES PATENT OFFICE.

BENJAMIN LOCKHART CHAMBERS, OF FRUITA, COLORADO.

ATTACHMENT FOR FLUSHING-TANKS.

1,149,896.  Specification of Letters Patent.  Patented Aug. 10, 1915.

Application filed September 23, 1914. Serial No. 863,104.

*To all whom it may concern:*

Be it known that I, BENJAMIN L. CHAMBERS, a citizen of the United States, and a resident of Fruita, in the county of Mesa and State of Colorado, have invented a new and useful Improvement in Attachments for Flushing-Tanks, of which the following is a specification.

My invention is an improvement in attachments for flushing tanks, and has for its object to provide a connection between a flushing tank and its supply pipe for absorbing and eliminating the chattering, jarring noises incident to the refilling of such tank after flushing.

In the drawings: Figure 1 is a perspective view with the improved pipe in place, Fig. 2 is a longitudinal vertical section of the pipe, and Fig. 3 is a section on the line 3—3 of Fig. 2.

The present embodiment of the invention is shown in connection with the flushing tank 1 of a closet bowl 2, the said tank and bowl being of any usual or desired construction. In the present instance the tank is operated to flush the bowl by means of a lever 3, which extends through a vertical slot 4 in the end of the tank, and a grip or handle 5 is connected to the outer end of the lever by means of a flexible member 6.

The improvement is arranged between the water supply pipe 7 for the tank and the tank, and connects the supply pipe with the tank. The supply pipe 7 enters through the floor 8 in the usual manner and the tank 1 is connected to the bowl by the usual connection 9.

The improvement comprises a tubular casing or pipe 10 of rubber or the like, preferably a section of heavy rubber tubing. A nut 11 connects the supply pipe with the lower end of the casing, the nut having an internally threaded opening 12, into which the upper end of the pipe 7 is threaded. The nut is of a diameter to fit closely within the lower end of the tubular casing, and a sleeve or ferrule 13 encircles the casing at the nut to clamp the casing to the nut in a water tight joint.

It will be noted from an inspection of Fig. 2, that the ferrule is corrugated annularly to provide a better joint. The upper end of the nut 11 is recessed or cupped as indicated at 14, and the upper end of the supply pipe 7 extends well up into the cup or recess but not so high as the upper end of the nut. Thus an annular cavity is formed in the upper end of the nut encircling the supply pipe. The pipe 15 which connects the upper end of the tubular casing 10 with the flushing tank passes through a stuffing box 16 into the tank, and the said pipe extends into the tubular casing to a point near the bottom thereof, as shown in Fig. 2.

A filling nut 17 encircles the pipe 15 at the upper end of the tubular casing, the said nut filling the space between the pipe and the casing, and a sleeve or ferrule 18, similar to the sleeve or ferrule 13, encircles the casing at the nut 17, and makes a water tight joint between the pipe and the casing. It will be noted from an inspection of Fig. 2 that the nut 17 is annularly reduced at its lower end to fit within the tubular casing, as indicated at 19, and the upper end of the tubular casing bears against an annular shoulder 20, formed between the body of the nut and the reduced portion.

The upper end of the nut 13 is cupped or recessed as indicated at 21, and the nut is externally threaded at its upper end and above the shoulder 20. A packing 22 is arranged within the recess or depression 21, and a cap 23 is threaded on to the upper end of the nut, the cap coöperating with the nut to compress the packing 22 around the pipe 15 in order to make a tight joint.

The lower end of the pipe 15 is closed by a hood or shield to prevent the direct passage of the water from the supply pipe to the inlet pipe, said shield or hood being in the form of a cap 24, the said cap being locked upon the lower end by means of struck up lugs 25 at the inner surface of the cap which engage notches in the pipe. The cap and the pipe are provided with registering radial openings 26, for permitting the entrance of water to the pipe. The lower end of the pipe is however, closed by the cap so that the water cannot flow directly from the supply pipe 7 into the adjacent end of the pipe 15. The annular chamber formed between the pipe 15 and the tubular casing 10 is the air chamber and forms a cushion to absorb the noise and jar usually found in closets of this character.

It will be noted from an inspection of Fig. 3, that the ferrules of sleeves 13 and 18 are releasable. These sleeves are split sleeves, each having radial flanges 27 and 28 at the split. Bolts 29 are passed through registering openings in the flanges, and nuts 30 are threaded on to the bolts to clamp the flanges together. One of the flanges in the present instance, the flange 28, has an outwardly extending rib 31, for engaging the adjacent nuts to prevent rotation thereof.

The tubular casing 10 may be removed merely by releasing the ferrules 13 and 18. The cup or recess 14 in the lower end is for the purpose of preventing the entrance of sediment into the open upper end of the supply pipe 7. Any sediment that may enter will fall into this recess, and thus will not choke the pipe 7 nor the pipe 15.

In operation, when the tank 1 has been emptied the water begins to flow through the pipe 7 to refill the same. With the improvement however, the water does not flow directly into the tank but flows into the tubular casing 10. As the water flows the air is compressed in the upper end of the chamber, and the water is forced out of the chamber through the openings 26 into the pipe 15, and into the tank. The chattering, jarring, noise, incident to the filling of tanks of this character is absorbed by the cushion of air in the tubular casing 10, and since the casing itself is flexible and resilient as well as the cushion, the casing absorbs a portion of the noise in question.

Since the pipe 10 is of rubber or non-conducting material, and since this pipe is the only connection between the pipes 7 and 15, it will be obvious that no electric currents may pass over the said pipe 10, and that the said pipe will insulate the said pipes 7 and 15 from each other, thus preventing the deleterious action of such currents on the piping.

It will be observed that the pipe 10 is the sole connection between the supply pipe and the inlet pipe. Thus the metallic continuity between the pipes is broken at the casing 10, and it is to this break in the continuity of the metal that the elimination of the chattering, jarring noise incident to filling of the tank is due to a very considerable extent. The cushion of air formed in the casing or pipe 10, the flexibility and elasticity of the pipe or casing 10 and the break in continuity all combine to attain this end.

I claim:—

1. A device of the character specified, comprising in combination with the flushing tank, the inlet pipe thereof, and the supply pipe therefor, of a tubular casing of flexible material arranged between the supply pipe and the tank, said casing being connected at its lower end to the supply pipe with a fluid tight joint and the inlet pipe of the tank extending through the upper end of the casing to near the bottom thereof and having a fluid tight connection at its upper end with the casing, the lower end of the inlet pipe being spaced apart from the upper end of the supply pipe, a cap fitting over the lower end of the inlet pipe and having radial openings, the inlet pipe having openings registering therewith, and the tubular casing being of greater diameter than the inlet and supply pipes to form an annular chamber between the said pipes and the casing, said fluid tight joint comprising filling nuts arranged between the ends of the casing and the inlet and supply pipes, said nuts fitting within the casing, clamping sleeves engaging the casing outside of each nut, the upper ends of the nuts being recessed, and the supply pipe extending to near the upper end of the lower end, and a packing between the upper end of the casing and the inlet pipe.

2. A device of the character specified comprising in combination with the tank, the inlet pipe extending into the tank for supplying the said tank, and the supply pipe for connection with the inlet pipe, of a tubular casing of flexible non-metallic material arranged between the supply and inlet pipes and connected at one end to the supply pipe with a fluid-tight joint, the inlet pipe extending through the other end of the said casing and to near the opposite end thereof, the ends of the supply and inlet pipes being spaced apart from each other in the casing, said casing having a fluid tight connection at the end adjacent to the inlet pipe and between the said inlet pipe and the casing, and a hood arranged between the adjacent ends of the inlet and supply pipe to prevent the direct flow from the supply pipe to the inlet pipe, said hood or shield comprising a cap detachably connected with the inlet pipe, said cap and inlet pipe having registering radial openings, said flexible tubular casing forming the sole connection between the inlet and the supply pipes.

3. A device of the character specified comprising in combination with the tank, the inlet pipe extending into the tank for supplying the said tank, and the supply pipe for connection with the inlet pipe, of a tubular casing of flexible non-metallic material arranged between the supply and inlet pipes and forming the sole connection between the said pipes and connected at one end to the supply pipe with a fluid-tight joint, the inlet pipe extending through the other end of the said casing and to near the opposite end thereof, the ends of the supply and inlet pipes being spaced apart from each other in the casing, said casing having a fluid tight connection at the end adjacent to the inlet pipe and between the said inlet pipe and the casing, and a hood arranged between the adjacent ends of the inlet and supply pipe to prevent the direct flow from the supply pipe to the inlet pipe.

4. A device of the character specified comprising in combination with the tank, the inlet pipe extending into the tank for supplying the said tank, and the supply pipe for connection with the inlet pipe, of a tubular casing of flexible non-metallic material arranged between the supply and inlet pipes and forming the sole connection between the said pipes and connected at one end to the supply pipe with a fluid-tight joint, the inlet pipe extending through the other end of the said casing and to near the opposite end thereof, the ends of the supply and inlet pipes being spaced apart from each other in the casing, said casing having a fluid tight connection at the end adjacent to the inlet pipe and between the said inlet pipe and the casing.

5. A device of the character specified, comprising in combination with the tank and the supply pipe for supplying water thereto, of a flexible non-metallic tube between the supply pipe and the tank and connecting the supply pipe to the tank and having a fluid tight joint with the supply pipe, said pipe being the sole connection between the tank and the supply pipe.

BENJAMIN LOCKHART CHAMBERS.

Witnesses:
W. A. MERRIELL,
H. G. McELFRESH.

Copies of this patent may be obtained for five cents each, by addressing the "Commissioner of Patents, Washington, D. C."